United States Patent [19]

Vietti et al.

[11] Patent Number: 5,610,243
[45] Date of Patent: Mar. 11, 1997

[54] POLYSULFIDE-EPOXY THERMOPLASTIC ELASTOMERS

[75] Inventors: David E. Vietti, Cary; Keith B. Potts, Elgin; Kimberley A. Leone, McHenry, all of Ill.

[73] Assignee: Morton International, Inc., Chicago, Ill.

[21] Appl. No.: 543,251

[22] Filed: Oct. 13, 1995

Related U.S. Application Data

[63] Continuation-in-part of Ser. No. 493,015, Jun. 21, 1995, abandoned, which is a continuation of Ser. No. 330,229, Oct. 27, 1994, abandoned, which is a continuation of Ser. No. 169,941, Dec. 20, 1993, abandoned.

[51] Int. Cl.$^6$ .......................... C08G 59/66; C08G 81/00
[52] U.S. Cl. .................. 525/523; 525/535; 528/109; 528/374
[58] Field of Search ............................. 525/535, 523; 528/109, 374

[56] References Cited

U.S. PATENT DOCUMENTS 4,689,389   8/1987   Lee et al. ................................. 528/109

FOREIGN PATENT DOCUMENTS

| 232058A | 11/1984 | German Dem. Rep. . |
| 232504A | 4/1985 | German Dem. Rep. . |
| 64-36622 | 7/1989 | Japan . |

*Primary Examiner*—Frederick Krass
*Attorney, Agent, or Firm*—Robert M. Didrick; Gerald K. White

[57] ABSTRACT

A thermoplastic elastomer is made by the reaction of an epoxy resin with a liquid mercapto-terminated polysulfide wherein the ratio of epoxy equivalents in the epoxy resin to mercapto equivalents is from about 0.6 to about 0.98, with the proviso that when the ratio is greater than about 0.95:1, the polysulfide is further reacted with an amount of a mono-epoxy compound sufficient to raise the ratio of total epoxy equivalents to mercapto equivalents to a maximum of 1:1. An elastomer having residual —SH groups is air-curable. The elastomer is useful as a hot melt sealant for insulated window units.

13 Claims, No Drawings

POLYSULFIDE-EPOXY THERMOPLASTIC ELASTOMERS

This is a continuation in part of application Ser. No. 08/493,015, filed on Jun. 21, 1995, now abandoned; which is a continuation of Ser. No. 08/330,229 filed Oct. 27, 1994, now abandoned; which is a continuation of Ser. No. 08/169,941 filed Dec. 20, 1993, now abandoned.

BACKGROUND OF THE INVENTION

This invention relates to thermoplastic elastomers made by the reaction of a thiol terminated polysulfide resin with an epoxy resin wherein the ratio of thiol equivalents to epoxy equivalents in the epoxy resin is critical to the formation of the thermoplastic elastomer rather than a liquid, a solid that is too soft and weak to be useful, or a solid that cannot be softened and processed at a temperature below its decomposition point. The invention here also relates to hot melt adhesives and sealants, particularly hot melt sealants for insulated glass windows.

The use of thiol terminated liquid polysulfides in caulks, sealants and the like for numerous applications is well known. Such materials normally are applied as liquids and chemically cured to solids in situ. Although the uncured polysulfides are classified along with most other natural and synthetic rubbers as thermoplastic materials, they have also been considered as sharing the property of most rubbers that once vulcanized, they cannot be induced to flow under heat and pressure without extensive degradation of the basic polymer chain and the consequent permanent loss of most or all of the desired properties. As is well known, also, it is difficult to hit a target average molecular weight and, thus, a target viscosity, when making liquid polysulfides. The molecular weight is usually adjusted by oxidation/reduction processes that are not completely efficient.

Liquid polyepoxide resins are typically cured by reaction with a second liquid resin such as an amino resin to give a hard, durable product. These two part liquid systems are widely used in adhesives, coatings and the like but for certain purposes a flexibilizer resin must be added to reduce rigidity.

The invention described in U.S. Pat. No. 2,789,958 formed the basis for the use of polysulfides as flexibilizers for epoxy resins. The reaction between the thiol groups of the polysulfides and the epoxy groups of epoxy resins in the presence of an amine catalyst gave hard, tough, sometimes rubbery products. When the catalyst was omitted, a tough rubbery polymer was obtained. In either case, the product was a thermoset elastomer.

Others in the field have followed up on the teachings of U.S. Pat. No. 2,789,958 but in every instance noted, the epoxy resin/polysulfide resin adduct has either been a liquid or a hard thermoset resin. U.S. Pat. Nos. 3,363,026; 3,536,656; 3,732,309; 4,214,067; and 4,689,389, along with British Patent 787,022, are representative of these efforts.

Hot melt sealants, in general, have not exhibited good structural properties on cooling and thus have not been adequate in applications where structural support by the sealant is required as in insulated glass window sandwiches. U.S. Pat. Nos. 4,165,425 and 4,314,920 teach the preparation of hot melt sealants from thiol terminated liquid polysulfides by extrusion. The present invention provides the convenience of the hot melt application and the good structural properties of a thermoplastic elastomer.

Thermoplastic elastomers (or TPE's) are materials that can be extruded, blow molded, injection molded, or otherwise processed like thermoplastics yet have properties similar to conventional rubbers. These materials offer several advantages over the conventional, thermoset, rubbers such as: simpler processing, shorter fabrication times, recyclable scrap, lower energy consumption, and better quality control. They are classified into six general categories: styrenic block copolymers; rubber-olefin blends; elastomeric alloys; thermoplastic polyurethanes; thermoplastic copolyesters; and thermoplastic polyamides. The present invention provides a new category.

SUMMARY OF THE INVENTION

It is an object of this invention, therefore, to provide a new kind of thermoplastic elastomer.

It is a related object of the invention to provide a thermoplastic elastomer by reacting a thiol terminated polysulfide resin with an epoxy resin.

It is another object of this invention to provide a method for preparing a polysulfide-based elastomer having a molecular weight within a targeted range.

It is still another object of the invention to provide hot melt adhesives.

It is another related object of this invention to provide an air-curable thermoplastic resin.

It is another related object of this invention to provide a hot melt sealants for insulated window units.

These and other objects of the invention which will become apparent from the following description are achieved by reacting an epoxy resin with a liquid mercapto-terminated polysulfide in a ratio of epoxy equivalents in the epoxy resin to mercapto equivalents of from 0.6:1 to 0.98:1; with the proviso that when the ratio is greater than 0.95:1, the polysulfide is further reacted with an amount of a monofunctional epoxy compound sufficient to raise the ratio of total epoxy equivalents to mercapto equivalents to a maximum of 1:1. The ratio of epoxy resin equivalents to equivalents of the mercapto group or —SH may be indicated hereinafter by reference to the first term of the ratio as the Index. The polysulfide provides long flexible or soft segments and the epoxy resin provides hard blocks that have limited compatibility with the polysulfide. These blocks provide labile crosslinks at ambient temperatures which dissociate at elevated temperatures to allow the elastomer to flow under pressure.

By the process described in this invention, the average molecular weight and, therefore, the melt viscosity, can be accurately controlled by the amount of excess liquid polysulfide or by the addition of a mono-functional epoxy compound. This provides a means for preparing an elastomeric material that can be processed at any desired temperature in the range of about 80° C. to about 180° C.

DETAILED DESCRIPTION OF THE INVENTION

The liquid polysulfides suitable for use in this invention are the linear polysulfides prepared by the condensation in aqueous suspension of sodium polysulfide with bis-(2-chloroethyl) formal and the branched polysulfides introduced by the incorporation at the manufacturing stage of up to about 2 mole percent of trichloropropane along with the bis-(2-chloroethylformal. The interspersal of —SCH$_2$CH(SH)CH$_2$S— groups engendered by the trichloropropane provides for crosslinking when desired. The general structure of both is described by the formula HSCH$_2$CH$_2$OCH$_2$OCH$_2$CH$_2$S[SCH$_2$CH$_2$OCH$_2$OCH$_2$CH$_2$S]$_m$|—SCH$_2$CH(SH)CH$_2$S—|$_n$SCH$_2$CH$_2$OCH$_2$O—CH$_2$CH$_2$SH wherein m is from about 5 to about 50, n is from 0 to about 1 and n/m is from about 0.002 to about 0.02 when greater than 0. They are described in U.S. Pat. Nos. 2,466,963 (Patrick et al); 2,789,958 Fettes et al); and 4,165,425 all of which are incorporated herein by reference. The preparation of the polysulfides is described also by E. R. Bertozzi in *Macromolecular Syntheses*, p.35, Vol. 7, E. M. Fettes, ed., John Wiley & Sons, Inc., New York, (1979). They are commercially available under the trademarks THIOKOL and LP from Morton International, Inc. and are exemplified by LP-2, LP-2C (branched), LP-3, LP-33, and LP-541. Preferably, the average molecular weight of the polysulfide is about 4000. A linear polysulfide such as LP-541 is preferable for sealant applications. Some of the properties of the LP polysulfides are shown in the following table:

|  | LP-2 | LP-3 | LP-12 | LP-31 | LP-32 | LP-33 | LP-541 |
|---|---|---|---|---|---|---|---|
| Average Molecular weight. | 4000 | 1000 | 4000 | 8000 | 4000 | 1000 | 4000 |
| Repeat unit 'n' value | 23 | 6 | 23 | 42 | 23 | 6 | 23 |
| % Branching (Mole %) | 2 | 2 | 0.2 | 0.5 | 0.5 | 0.5 | -0- |
| Average Viscosity at 25° C. (Pa. sec) | 47 | 1.2 | 47 | 110 | 47 | 1.7 | 47 |
| Average Viscosity at 4° C. (Pa. sec) | 380 | 9 | 380 | 740 | 380 | 16.5 | 380 |
| Pour Point (°C.) | 7 | −26 | 7 | 10 | 7 | −23 | 7 |
| Mercaptan (%) | 1.5–2.0 | 5.9–7.7 | 1.5–2.0 | 1.0–1.5 | 1.5–2.0 | 5.0–6.5 | 1.5–2.0 |

Various commercially available epoxy resins made by the reaction of epichlorohydrin with a di- or polyol and by the oxidation of polyolefins with peracetic acid are suitable for the purposes of this invention. The epoxy resins used are usually liquids but the solid resins may also be used. They may have an epoxide equivalent weight of from about 100 to about 800 and the viscosity of the liquid epoxy resins may be from about 1 to about 4500 centipoises at 25° C. (about 1 to about 4500×10$^{-3}$ pascal second). The bisphenols, e.g., bisphenol A, B, F, etc., halogenated derivatives thereof, ethylene glycol, diethylene glycol, propylene glycol, neopentyl glycol, 1,4-butanediol, and cyclohexanedimethanol are examples of the diols. Suitable polyols are exemplified by glycerol, trimethylolpropane, and the like. Another type of epoxy resin that is commercially available and is suitable for this invention is a hydantoin resin made by the reaction of epichlorohydrin and hydantoin. This product has an epoxide equivalent weight in the 130–137 range and is available from Ciba-Geigy under the product number XU AY 238. Liquid epoxy resins are available from Shell Chemical Company under the trademarks EPON and EPIKOTE, from Ciba-Geigy under the trademark ARALDITE, and from CVC Specialty Chemicals as ERYSIS GE-20, GE 21, GE 22 and GE-30. A Bisphenol F epoxy resin sold under the trademark and number Epotuff 37-138 is another example. Representatives of useful liquid Epikote epoxy resins are listed in U.S. Pat. No. 4,689,389, which also is incorporated herein by reference. Solid epoxy resins which are suitable here are exemplified by Shell's EPON 1001 F (eq. wt. 525–550), 1002 F (eq. wt. 600–700), and 2002 (eq. wt. 675–760) resins. Epoxysilane resins are particularly useful in that they provide terminal silane groups for crosslinking the TPE's of this invention. Mixtures of two or more epoxy resins may be used.

It should be understood that a mono-functional epoxy compound may be used along with the epoxy resin even when the Index is less than 0.9 and that it is not necessary in any case to tie up all of the available —SH groups. The terminal —SH groups afford sites for air curing of the resin and, therefore, when an air curing elastomer is desired, the amount of mono-epoxy compound should be limited so that the ratio of total equivalents of epoxy groups to mercapto groups is less than 1:1; the maximum ratio preferably being about 0.98:1. Whenever the mono-epoxy compound is used, however, the Index must be adjusted to ensure that the product has the desired properties of a thermoplastic elastomer. Suitable mono-functional epoxy compounds are available from Ciba-Geigy and are exemplified by cresyl glycidyl ether (DY 023), C12–C14 alkyl glycidyl ether (DY 025), and C8–C10 alkyl glycidyl ether (DY 027). Other examples include epoxidized alpha-olefin resins, which are available from Atochem under the VIKOLOX trademark, such as VIKOLOX 16 and VIKOLOX 20–24. CARDOLITE NC-513 is the trademark and number of another useful mono-epoxy compound which is an epoxidized phenol having an unsaturated fifteen carbon substituent on the ring. The epoxide equivalent of this product is 490.

The average molecular weight of the adduct can be targeted successfully by adjusting the Index within the 0.60 to 0.98 range given above using the Stockmayer Distribution Function for determining the molecular weight distribution in condensation polymers which is presented in Polymer Handbook, (3rd edition, J. Brandrup and E. H. Immergut, ed.), pp 289–290; Wiley, New York (1989). The following table illustrates the molecular weight that will result at the given Index from the condensation of the LP-541 polysulfide (average molecular weight of about 4000) and Epon 828 resin to yield a thiol-terminated TPE.

| INDEX | MOLECULAR WEIGHT $M_n$ |
|---|---|
| 0.6 | 11000 |
| 0.65 | 12000 |
| 0.7 | 14000 |
| 0.75 | 17000 |
| 0.8 | 22000 |
| 0.85 | 29000 |
| 0.9 | 43000 |
| 0.95 | 87000 |

In the case of an alkyl-terminated TPE made from the LP-541, the GE 21 epoxy resin, and a sufficient amount of the Cardolyte NC 513 mono-epoxy compound to raise the ratio to 1:1, the resulting molecular weight ($M_n$) is given in the following table:

| INDEX | MOL. WT $M_n$ |
|---|---|
| 0.75 | 18000 |
| 0.8 | 22000 |
| 0.85 | 29000 |
| 0.9 | 43000 |
| 0.95 | 86000 |
| 0.96 | 107000 |
| 0.97 | 140000 |
| 0.98 | 210000 |

The Index is preferably in the low range of 0.60–0.70 when a solid epoxy resin is adducted to the polysulfide. For most of the liquids, it is preferably in the 0.70.–0.80 range; in the case of predominantly aliphatic epoxy resins, the Index is preferably from about 0.75 to about 0.85. In general, the preferred Index is from about 0.60 to about 0.85. The prospective end use of the adduct plays a large role in the selection of the Index.

The reaction of the liquid polysulfide and the epoxy resin and, optionally, the mono-epoxide, could be carried out at room temperature but an uneconomically long time would be required. It is preferable to mix the reactants and a catalyst thoroughly and hold them at from about 80° to about 100° C. for from about 4 to about 16 hours. The practical maximum temperature over an extended period of time is about 120° C. but the reaction mixture may be heated to as high as about 180° C. for as long as about one minute. Degassing of the reaction mixture under reduced pressure is in some circumstances a preferable procedure. The catalyst may be a tertiary amine exemplified by a bicyclic fused ring amine such as triethylene diamine which is available under the trademark and number DABCO 33LV from Air Products. The amount of the catalyst may be from about 0.1 to about 1.0% of the total weight of the reaction mixture.

The tackiness, adhesion, hardness, and other properties of the thermoplastic elastomer formed by the polysulfide/epoxy adduct may be modified by suitable combinations thereof with other thermoplastic resins as co-resins. Natural and synthetic rubber, styrene/butadiene and other copolymers of styrene, polystyrene, cellulose esters and ethers, vinyl ester polymers and copolymers, polyamides, polyacrylic and polymethacrylic resins, vinylidene halide polymers such as the vinyl chloride/vinylidene chloride, polyesters, polyolefins such as polyethylene, polypropylene and copolymers thereof. A family of block copolymers of styrene sold by Shell under the KRATON trademark exemplifies one class of co-resins suitable for use in the compositions of this invention. Representatives of the KRATON family include styrene/butadiene/styrene (SBS), styrene/isoprene/styrene (SIS), and styrene/ethylene-butylene/styrene (S-EB-S). These and others are described in Shell's technical bulletin SC:68–92. Other useful co-resins include aromatic hydrocarbon resins such as PICCO 6085 or KRISTALEX 3100 sold by Hercules; the ethylene/vinyl acetate copolymers sold by Dupont under the trademark ELVAX; and saturated hydrocarbon resins such as those sold by Hercules under the trademark and number REGAL-REZ 1018. Depending on the property desired and the nature of the co-resin, the weight ratio of co-resin to the thermoplastic elastomer of this invention may be greater than 1:1 or as low as about 1:100 or even less. A preferable ratio is from about 1:2 to about 1:1.

Liquid plasticizers are useful to improve the flow rate of the resin blend. Examples include a high molecular weight benzyl phthalate ester sold by Monsanto under the trademark and number Santicizer 278; propylene glycol dibenzoate sold by Velsicol under the trademark and number Benzoflex 400; and chlorinated hydrocarbons sold under the trademark and number Paroil 8707 by Dover Chemical Company. Also solid plasticizers, such as cyclohexanedimethanol dibenzoate sold by Velsicol under the trademark Benzoflex 352, that melt below the desired operating temperature may be used. Particulate fillers such as carbon black; calcium carbonate and magnesium carbonate and mixtures thereof; and wollastonite, among others, are also useful as property modifiers. R. T. Vanderbilt Co. is the source of THERMAX 991 carbon black. A mixed calcium/magnesium carbonate is sold as by Georgia Marble Co. under its trademark and number GAMMA SPERSE 255 (GS 255 in the following tables). Wollastonite is available from Nyco Co. Chopped fibers and wood flour are also useful. To provide light weight sealants, hollow plastic microspheres are suitable low density fillers. Expancell's 091 DE filler has a density of 0.03 g/cc. A filler having a density of 0.02 g/cc is available from PQ Co. under its trademark and number PM 6545. Pierce Steven Co. also provides a filler having a density of 0.02 g/cc under the trademark DUALITE 6001 AE. Glass microspheres having a density of 0.29 g/cc are sold by PQ Co. under its trademark and number PQ 650. The weight of filler used is determined by its density and the properties desired in the final product; it is generally in the range of 20 to 40% of the total weight.

The invention is more fully described by the following examples in which all parts are by weight unless otherwise indicated. Flow measurements were made by a modification of ASTM D1238, the standard method for measuring flow rates of thermoplastics by an extrusion plastometer. Measurements were made at 105° C. with a 3160 gram weight unless otherwise specified. The preheat time was 4 minutes. The number of seconds for a one-inch flow is reported instead of the number of grams per ten minutes. The tensile strength was measured by ASTM D638, using a separation rate of 20"/min. A rod geometry was employed for Examples 5–36 and a rectangular geometry was used for all others. The test procedures for elongation and modulus are ASTM D638 and D412.

EXAMPLES 1–4

Forty parts (0.0206 eq) of a polysulfide (LP-541) and various portions (to give the Index shown in Table I below) of a solid epoxy resin (EPON 2002; eq. wt. 750) were heated in a reaction vessel at 100° C. until the epoxy resin melted and the mixture was stirred to form a homogeneous solution before about 0.2 part of DABCO 33 LV amine catalyst was added. The reaction mixture was held at 100° for about 16 hours to give products characterized by their hardness and melt viscosity in Table I.

TABLE I

| Ex. No. | Index (epoxy/SH) | Flow time (sec) 3160 grams | Hardness Shore A |
|---|---|---|---|
| 1 | 0.60 | 69 | 10 |
| 2 | 0.62 | 110 | 12 |
| 3 | 0.63 | 152 | 15 |
| 4 | 0.65 | 96 | 16 |

EXAMPLES 5–10

The reaction mixture shown in Table II below was heated at 80° C. for 16 hours at a reduced pressure (absolute) of about 9.9 inches of mercury (33 kPa) to give products having the properties shown in the Table.

TABLE II

| Ex. No. | LP 541 | Epon 828 | Epotuff 37-138 | Epon 2002 | Index | Dabco 33 LV | Flow @ 105 C. | Tensile psi | Elongn. % | 20% Mod. psi |
|---|---|---|---|---|---|---|---|---|---|---|
| 5 | 100 | 6.74 | x | x | 0.7 | .47 | 40 Sec. | 12.82 | <1000% | 4.958 |
| 6 | 100 | 7.23 | x | x | 0.75 | .51 | >1000 Sec. | 27.01 | >1000% | 6.324 |
| 7 | 100 | x | 6.49 | x | 0.67 | .45 | >1000 Sec. | 29.52 | >1000% | 6.294 |
| 8 | 100 | x | 6.96 | x | 0.72 | .49 | >1000 Sec. | 60.24 | >1000% | 12.56 |
| 9 | 400 | x | x | 97.5 | 0.63 | 7.00 | 67 Sec. | 19.7 | >1000% | 8.1 |
| 10 | 400 | x | x | 100 | 0.65 | 7.00 | 256 Sec. | 47.3 | >1000% | 18.5 |

EXAMPLES 11-39

The properties of the polysulfide based thermoplastic elastomer of Example 5 (TPE) were modified by the addition of co-resins, fillers, and plasticizers in the amounts and with the results shown in Table III. The blends were made with a Haake Torque Rheometer in a Brabender 60 ml mix head with the RPM of the roller blades at 30 and the temperature at 130°-160° C. In most cases, the head space of the mixer was flushed with nitrogen to prevent air oxidation. The product of Example 34 was used as a sealant for an insulated glass window.

An insulated glass window in which the sealant was the product of Example 34 was conditioned for one week at ambient indoor temperatures and the frost point was -90° F. after one year of outdoor exposure as determined by the ASTM-E546 method.

EXAMPLES 40-58

Various LP polysulfides from Morton and various epoxy resins identified in TABLE IV were mixed in the proportions indicated by the epoxy/SH Index there with 1% by weight of the total mixture of DABCO 33 LV catalyst. The mixtures were degassed under vacuum and then placed in a vacuum oven (at 5-10 in. Hg (abs.), 16.5-33.8 kPa) at 80°-100° C. for about 16 hours. The SH terminated adducts had the properties shown in TABLE IV.

TABLE III

| Ex. No. | Resin of Ex. 5/Parts | Co-Resin/ Parts | Plast./ Parts | Filler Parts | Thermax 991/ Parts | Silane/ Parts | Irganox 1010/ Parts | Flow @ 105 C. X grams, sec. | Tensile psi | Elong. % | 20% Mod. psi | Shore A |
|---|---|---|---|---|---|---|---|---|---|---|---|---|
| 11 | 54 | D1102*/6 | x | x | x | x | x | 85 | 49.12 | >1000 | 17.41 | x |
| 12 | 48 | D1102/12 | x | x | x | x | x | 173 | 27.30 | 935 | 15.86 | x |
| 13 | 35 | x | x | GS255/30 | x | .3 A-189 | x | Too Soft | 15.49 | 760 | 13.26 | x |
| 14 | 35 | x | x | GS255/30 | x | .1 A-189 | x | 21 | 5.45 | 397 | 5.38 | x |
| 15 | 35 | x | x | GS255/30 | x | .3 A-187 | x | 251 | 29.5 | 620 | 16.99 | X |
| 16 | 35 | x | D8707/3.9 | GS255/30 | x | .3 A-187 | x | 123 | 9.61 | >1000 | 8.11 | x |
| 17 | 36 | x | P-400/3 | GS255/30 | x | .3 A-187 | x | 81 | 22.85 | >1000 | 11.98 | x |
| 18 | 30 | x | x | GS255/30 | x | .3 A-187 | x | 219 | 75.39 | 377 | 42.36 | x |
| 19 | 32 | x | B352/3 | GS255/30 | x | .3 A-187 | x | 162 | 45.52 | 469 | 45.1 | x |
| 20 | 35 | x | x | Wollas/30 | x | .3 A-187 | x | 381 | 27.05 | >1000 | 21.98 | 22 |
| 21 | 31 | x | B352/4 | Wollas/30 | x | .3 A-187 | x | 199 | 65.36 | 374 | 63.46 | 40 |
| 22 | 31 | x | B352/6 | Wollas/15 | 15 | .3 A-187 | x | 175 | 65.52 | 141 | 62.49 | 35 |
| 23 | 31 | x | B352/4 | Wollas/30 | 5 | .3 A-187 | x | 140 | 71.26 | 429 | 69.33 | 46 |
| 24 | 26 | x | C-70/4 | GS255/30 | 5 | .3 A-187 | x | >1000 | 28.49 | 842 | 19.51 | 20 |
| 25 | 28 | x | C-70/2 | GS255/30 | 5 | .3 A-187 | x | >1000 | 29.03 | 822 | 24.38 | 19 |
| 26 | 24 | x | C-70/6 | GS255/30 | 5 | .3 A-187 | x | >1000 | 33.9 | 782 | 27.72 | 21 |
| 27 | 26 | P-6085*/4 | x | GS255/30 | 5 | .3 A-187 | x | >1000 | 38 | 691 | 32.33 | 24 |
| 28 | 28 | P-6085/2 | x | GS255/30 | 5 | .3 A-187 | x | 335 | 34.67 | 710 | 28.78 | 24 |
| 29 | 24 | P-6085/6 | x | GS255/30 | 5 | .3 A-187 | x | >1000 | 78.44 | 450 | 51.38 | 24 |
| 30 | 30 | x | x | GS255/30 | x | .3 A-187 | x | 320 | 44.68 | 699 | 19.33 | x |
| 31 | 30 | x | x | GS255/34 | 1 | .3 A-187 | x | 400 | 79.28 | 900 | 27.76 | x |
| 32 | 30 | x | x | GS255/33 | 2 | .3 A-187 | x | 420 | 55.74 | 615 | 29.94 | x |
| 33 | 29 | x | B352/1 | GS255/34 | 1 | .3 A-187 | x | 310 | 53.67 | 487 | 32.68 | x |
| 34 | 28 | x | B352/2 | GS255/34 | 1 | .3 A-187 | x | 280 | 60.55 | 401 | 43.49 | x |
| 35 | 29 | x | B352/3.9 | GS255/33 | 2 | .3 A-187 | x | 450 | 51.81 | 309 | 33.98 | x |
| 36 | 28 | x | B352/2 | GS255/33 | 2 | .3 A-187 | x | 340 | 47 | 278 | 33.38 | x |
| 37 | 30 | x | B352/2 | GS255/34 | 1 | .3 A-187 | .2 | 335 | 44.97* | 421 | 37.1 | x |
| 38 | 30 | P-6085/1 | B352/1 | GS255/34 | 1 | .3 A-187 | .2 | 202 | 47.48* | 580 | 30.09 | x |
| 39 | 30 | P-6085/3 | B352/2 | GS255/34 | 1 | .3 A-187 | .2 | 266 | 63.11 | 244 | 56.59 | x |

*D1102 is a Kraton resin; P-6085 is a Picco resin
*Sheets were pressed for tensile properties, all other samples were done in a cylindrical form.

TABLE IV

| Ex. No. | LP | Epoxy | Index | Tensile Max. (psi) | 20% Modulus (psi) | Ult. Elongn. % | Hardness Shore A | Flow min:sec 3160 g, 110 C. |
|---|---|---|---|---|---|---|---|---|
| 40 | 541 | GE 21 | .80 | 13.8 | 1.1 | 1811 | 8 | 4:51 |
| 41 | 541 | GE 21 | .85 | 14.7 | 0.8 | 1649 | 8 | 9:57 |
| 42 | 2 C | GE 21 | .8 | 41.4 | 11.0 | 488 | 9 | No Flow |
| 43 | 2 C | GE 21 | .85 | 49.7 | 11.2 | 456 | 9 | |
| 44 | 2 C | GE 21 GE 30 | .8 .02 | 63.5 | 11.6 | 712 | 10 | No Flow |
| 45 | 2 C | GE 21 GE 30 | .8 .04 | 66.4 | 13.0 | 576 | 11 | No Flow |
| 46 | 541 | GE 21 | .75 | 18.0 | 0.62 | 2002 | 14 | |
| 47 | 541 | GE 21 | .80 | 35.77 | 7.7 | 1432 | 14 | |
| 48 | 12 | GE 21 | .75 | 13.4 | 0.37 | 3372+ | 3 | |
| 49 | 12 | GE 21 | .77 | 20.1 | 0.744 | 2066 | 7 | |
| 50 | 1649 | EPON 828 | .75 | 6.4 | 1.3 | 5422+ | | |
| 51 | 541 | NC 514 | .74 | | | | 30 | No Flow |
| 52 | 541 | NC 514 NC 547 | .72 .023 | | | | 30 | No Flow |
| 53 | 1649 | EPON 828 GE 20 | .5 .4 | | | | | 3:32 |
| 54 | 541 | XUAY 238 | .7 | | | | | 0:40 |
| 55 | 541 | XUAY 238 EPON 828 | .35 .35 | | | | | 0:40 |
| 56 | 541 | CY 8043* | .70 | | | | | 1:12 |
| 57 | 541 | CY 8043 | .75 | 7.4 | 6.0 | 1800+ | 8 | 3:31 |
| 58 | 541 | GE 22 | .90 | 6.8 | 5.4 | 1800+ | 4 | 2:28 |

*CY 8043 is a brominated epoxy resin

EXAMPLES 59–78

The effect of mono-epoxy compounds on the properties of the polysulfide/epoxy resin adduct is shown by the test results for the products made from the reaction mixtures indicated in Table V. Butanediol diglycidyl ether was the epoxy resin in each of the examples except for Examples 64 and 65 where the epoxy resin was cyclohexanedimethanol diglycidyl ether. The LP polysulfide and the mono-epoxy compound are indicated in the table and the ratio of equivalents of epoxy resin to equivalents of —SH groups is shown by the Index. The amount of mono-epoxy compound is sufficient to make the ratio of total equivalents of epoxy function to —SH equivalents equal to 1:1.

TABLE V

| Ex. No. | LP | Mono Epoxy | Index | Tensile Max. (psi) | 20% Modulus (psi) | Ult. Elongn. (%) | Hardness (Shore A) or OO) | Flow min:sec 3160 g 110 C. |
|---|---|---|---|---|---|---|---|---|
| 59 | 541 | DY023 | .85 | 6.5 | 0.4 | * | | 2:30 |
| 60 | 541 | DY023 | .90 | 26.5 | 0.7 | * | 5 (A) | 13:00 |
| 61 | 2 C | DY023 | .85 | 45.7 | 6.4 | 827 | 6 (A) | Very Slow |
| 62 | 541 | NC-513 | .85 | | | | | Very Soft |
| 63 | 541 | NC-513 | .9 | 3.5 | 0.5 | * | | 1:10 |
| 64 | 541 | NC-513 | .95 | 12.8 | 0.41 | 2702 | 2 (A) | 8:30 |
| 65 | 541 | NC-513 | .97 | | | | | |
| 66 | 541 | NC-513 | .98 | | | | | |
| 67 | 541 | NC-513 | .95 | 4.8 | 3.8 | 1800+ | 4(A) | 3:30 |
| 68 | 541 | NC-513 | .98 | 24.5 | 7.7 | 1800+ | 4(A) | 64:23 |
| 69 | 2 C | NC-513 | .9 | 53.8 | 4.9 | 1283 | 50 (OO) | Slow @ 110 5:41 @ 160 C. |
| 70 | 32 C | NC-513 | .9 | 16.3 | 0.3 | 3350 | 54 (OO) | 4:30 |
| 71 | 12 C | NC-513 | .9 | 7.1 | .5 | * | 48 (OO) | 3:00 |
| 72 | 32 C | NC-513 | .95 | 37.7 | .74 | 2172 | 55 (OO) | Slow @ 110 19:48 @ 160 C. |
| 73 | 2 C | NC-513 | .95 | 67.7 | 14.6 | 719 | 72 (OO) | 29:00 @ 110 2:18 @ 160 C. |
| 74 | 12 C | NC-513 | .95 | 21.8 | .17 | 2748 | 60 (OO) | 12:02 |
| 75 | 1649 | NC-513 | .95 | 4.7 | .1 | * | 46 (OO) | 1:27 |
| 76 | 32 C | Vikolox 16 | .90 | 33.8 | 4.5 | 1313 | 13 (A) | |
| 77 | 32 C | Vikolox 20–24 | .90 | 71.8 | 16.6 | 1000 | 26 (A) | |
| 78 | 32 C | Vikolox 20–24 | .85 | 71.8 | 18.7 | 936 | 28 (A) | |

*High elongation did not break.

EXAMPLES 79–88

The general procedure of Examples 11–39 was repeated with the TPE of Example 67 (except for Ex. 81 wherein the base resin was the product of Example 70) and the co-resins as identified in and in the amounts shown in Table VI along with the results of testing the properties of the products as indicated.

TABLE VI

| Ex. No. | Base Ex 67 | Coresin/Wt. | Tensile Max. (psi) | 20% Modulus (psi) | Ult. Elongn. (%) | Hardness (Shore A) | Flow min:sec 3160 g 110 C. |
|---|---|---|---|---|---|---|---|
| 79 | 50 | NipolVT330 nitrile rubber/10 | 19.8 | 0 | 1923 | 55 (OO) | |
| 80 | 40 | Zeon 4051G acrylic rubber/10- sheet shrunk when cooled | | | | | |
| 81 | 40 | Kraton D1102/10 | 75.7 | 17.9 | 811 | 24 | |
| 82 | 40 | Oxychem PVC 1415/10 | 30.9 | 19.6 | 951 | 17 | |
| 83 | 40 | Elvax 210/10 | 28.9 | 6.5 | 1832 | 11 | |
| 84 | 40* | Kraton D1102/15 | 98.5 | 24.5 | 922 | 30 | 1:44 @ 160 C. |
| 85 | 40 | Kraton D1102/15 Elvax 210/10 | 99.9 | 32.8 | 424 | 43 | |
| 86 | 30 | Elvax 210/10 Benzo 352/5 GS255/20 | 31.0 | 29.6 | 586 | 33 | |
| 87 | 25 | Elvax 210/15 Benzo 352/3 GS255/20 | 42.5 | 38.4 | 361 | 43 | |
| 88 | 20 | Elvax 210/15 GS255/20 Thermax 991/2 | 45.0 | 39.9 | 225 | 44 | |

*Ex. 84 Used Base Resin from Ex. 70.

EXAMPLES 89–92

The general procedure of Examples 11–39 was repeated with the mono-epoxy modified TPE of Example 59, Kraton D1102 and Picco 6085 co-resins and GS255 filler in the amounts the amounts shown in Table VII, along with the results of testing the properties of the products as indicated. All formulations contained one part of Thermax 991 carbon black. The product of Example 91 (with 0.4% silane A-187 added) was used as a sealant for an insulated glass window. After the window was stored in a high humidity chamber for 14 weeks in accordance with the ASTM-E773 procedure, it still had a frost point of −90° F.

EXAMPLES 93–104

The general procedure of Examples 86–89 was repeated except that the blending was carried out in a Haake Rheocord 90 at 150° C. (and the base resin for Example 104 was the TPE of Ex. 64), and various Kraton resins and other components were used as identified in and in the amounts shown in Table VIII along with the results of testing the properties of the products as indicated. All formulations contained five parts of Titanox 2101 to give a white product and as a UV shield. NYAD 325 is the NYCO trademark and number for wollastonite.

TABLE VIII

| Ex. No. | Base Ex. 59 | Kraton D1102 | Picco 6085 | GS255 | Tensile Max. (psi) | 20% Modulus (psi) | Ult. Elongn. (%) | Hardness (Shore A) | Flow min:sec 3160 g 110 C. |
|---|---|---|---|---|---|---|---|---|---|
| 89 | 20.0 | 10.0 | 5.0 | 20 | 206 | 68 | 1528 | 51 | 8:40 |
| 90 | 25.0 | 10.0 | 6.0 | 20 | 125 | 40 | 1475 | 37 | |
| 91 | 22.5 | 7.5 | 8.0 | 20 | 83 | 42 | 1184 | 46 | 3:15 |
| 92 | 31.5 | 4.5 | 9.6 | 24 | | | | | |

TABLE VIII

| Ex. No. | Base Resin Ex. 59 | GS255 | Kraton Type/ Parts | Regal-rez 1018 | Kristalex 3100 | Final Torque g − m | 100% Modulus (psi) | Max. Tensile (psi) | Ult. Elongn. | Hardness (Shore A) |
|---|---|---|---|---|---|---|---|---|---|---|
| 93 | 20 | 20 | GRP6906/10 | 5 | | 186 | 54.4 | 156 | 995 | 30 |
| 94 | 20 | 20 | G1652/10 | 5 | | 206 | 51.5 | 163 | 902 | 33 |
| 95 | 20 | 20 | G1652/15 | 5 | | 357 | 74.5 | 217 | 810 | 44 |
| 96 | 15 | 20 | G1652/15 | 5 | 5.0 | 357 | 154.0 | 223 | 405 | 71 |
| 97 | 15 | 20 | G6906/15 | 5 | 5.0 | 293 | 114.0 | 333 | 683 | 58 |
| 98 | 15 | 20 | G1657X/15 | 5 | 5.0 | 234 | 86.8 | 376 | 1462 | 46 |

TABLE VIII-continued

| Ex. No. | Base Resin Ex. 59 | GS255 | Kraton Type/ Parts | Regal-rez 1018 | Kristalex 3100 | Final Torque g−m | 100% Modulus (psi) | Max. Tensile (psi) | Ult. Elongn. | Hardness (Shore A) |
|---|---|---|---|---|---|---|---|---|---|---|
| 99  | 20 | 15        | D1102/10       |   | 7.5  | 53  |       | 153 | 148  | 62 |
| 100 | 15 | 15        | D1102/15       |   | 7.5  | 210 | 136.0 | 592 | 1695 | 71 |
| 101 | 20 | 15        | D1102/10       | 1 |      | 176 | 48.2  | 125 | 1248 | 40 |
| 102 | 15 | 15        | D1102/15       | 1 |      | 266 | 80.6  | 286 | 1429 | 48 |
| 103 | 15 | 15        | D1107/15       | 1 |      | 240 | 34.5  | 152 | 1776 | 25 |
| 104 | 20 | NYAD 325 20 | G1652/10 ZnO/2 | 8 | 10.0 | 277 | 216.0 | 267 | 414  | 76 |

EXAMPLES 105–110

The use and effect of low-density fillers in sealant formulations containing the TPE of Example 67 and Picco 6085 co-resin and the GS 255 filler is shown in Table X along with the parts by weight of each component for Examples 105–110. The blending procedure is generally that of Examples 79–88 except that in Example 109 the base resin of the sealant is the product of Example 62 and 2 parts of Elvax 210 EVA copolymer. In Example 110, 22.5 parts of the TPE of Ex. No. 62, 7.5 parts of Kraton D1102, 6 parts of Picco 6085, and 2 parts of Elvax 210 were blended with 2.5 parts of the Dualite 6001AE filler and 10 parts of the GS255 filler. Also, the product of Example 105 contained one part of Thermax 991 carbon black and six parts of Benzoflex 352 benzoate while the products of Examples 106–110 contained 0.5 part and three parts, respectively.

NC513 mono-epoxy compound, and 1 part of Dabco 33LV catalyst.

In Table X, several properties of a typical hot melt sealant of this invention are compared with those of a sealant from an oxidatively cured LP polysulfide.

TABLE X

| MATERIAL | Max. Tensile (psi) | Ult. Elongation | Hardness (Shore A) |
|---|---|---|---|
| Hot Melt I.G. Sealant | 48 | 780 | 41 |
| Cured LP Sealant | 200 | 200 | 50 |

TABLE IX

| Ex. No. | Base Resin Ex. 67 | Low Density Filler | Picco 6085 | GS255 | Tensile Max. (psi) | 20% Modulus (psi) | Ult. Elongn. (%) | Hardness (Shore A) | Flow min:sec 3160 g 110 C. |
|---|---|---|---|---|---|---|---|---|---|
| 105 | 31.5 | 091 DE 0.69     | 10 | 10 | 48.5 | 42.8 | 227 | 45 |      |
| 106 | 16   | 091 DE 0.6 g    | 6  | 5  | 51.0 | 46.0 | 85  | 40 |      |
| 107 | 20   | PM 6545 0.6 g   | 10 | 10 | 28.0 | 27.0 | 157 | 25 |      |
| 108 | 23   | Duolite 6001AE 2.6 | 10 | 10 | 25.0 | 24.0 | 155 | 25 |      |
| 109 | **   | PQ350           |    |    | 46.7 | 42.1 | 369 | 50 | 1:00 |
| 110 | **   | **              | ** | ** | 66.0 | 39.0 | 863 | 35 | 3:04 |

** As given above.

EXAMPLE 111

A TPE having silane terminal groups was prepared by mixing 300 parts (0.1545 eq.) of the LP-541 polysulfide resin, 0.131 equivalent of butanediol diglycidyl ether (GE 21) (Index=0.85), 8.33 parts (0.017 eq.) of the Cardolyte NC-513 mono-epoxy compound, 1.46 parts (0.0062 eq.) of an epoxy silane resin (A-187 from . . . ), and 1.2 parts of Dabco 33LV catalyst, degassing it and heating it in an 80° C. vacuum oven at 22 inches of mercury (72.6 kPA).

EXAMPLE 112

An air-curable TPE having free —SH groups remaining after partial termination with alkyl groups from a mono-epoxy reactant was prepared by the general procedure of Example 111 except that 1941 parts (1.0 eq.) of the LP-541 was used along with 114 parts (0.875 eq.) of the butanediol diglycidyl ether and 36.75 parts (0.075 eq.) of the Cardolyte The subject matter claimed is:

1. A thermoplastic elastomer comprising an adduct of a liquid polysulfide having a general structure described by the formula $$HSCH_2CH_2OCH_2OCH_2CH_2S[SCH_2CH_2OCH_2OCH_2CH_2S]_m[-SCH_2CH(SH)CH_2S-]_nSCH_2CH_2OCH_2O-CH_2CH_2SH$$

wherein m is from about 5 to about 50, n is from 0 to about 1 and n/m is from about 0.005 to about 0.02 when n is greater than 0 and a solid epoxy resin in which the ratio of epoxy equivalents to mercapto equivalents is from about 0.6:1 to about 0.7:1, or a liquid epoxy resin in which the ratio of epoxy equivalents to mercapto equivalents is from about 0.7:1 to about 0.95:1 and, optionally, an amount of a monofunctional epoxy compound sufficient to raise the ratio of total epoxy equivalents to mercapto equivalents from 0.95:1 to a maximum of 1:1.

2. The elastomer of claim 1 wherein the epoxy resin is a liquid and the ratio is from about 0.7:1 to about 0.85:1.

3. The elastomer of claim 1 wherein the epoxy resin is solid.

4. The elastomer of claim 2 wherein the epoxy resin is aromatic.

5. An air-curable hot melt sealant comprising a thermoplastic elastomer which is an adduct of an uncured mercapto-terminated polysulfide having a general structure described by the formula $$HSCH_2CH_2OCH_2OCH_2CH_2S[SCH_2CH_2OCH_2OCH_2CH_2S]_m[-SCH_2CH(SH)CH_2S-]_nSCH_2CH_2OCH_2O-CH_2CH_2SH$$

wherein m is from about 5 to about 50, n is from 0 to about 1 and n/m is from about 0.005 to about 0.02 when n is greater than 0, and a solid epoxy resin in which the ratio of epoxy equivalents to mercapto equivalents is from about 0.6:1 to about 0.7:1, or a liquid epoxy resin in which the ratio of epoxy equivalents to mercapto equivalents is from about 0.7:1 to about 0.95:1.

6. The sealant of claim 5 wherein the polysulfide is a liquid.

7. The sealant of claim 5 wherein the epoxy resin is solid.

8. A method for preparing a thermoplastic elastomer, said method comprising heating a mixture of a liquid polysulfide having a general structure described by the formula $$HSCH_2CH_2OCH_2OCH_2CH_2S[SCH_2CH_2OCH_2OCH_2CH_2S]_m[-SCH_2CH(SH)CH_2S-]_nSCH_2CH_2OCH_2O-CH_2CH_2SH$$

wherein m is from about 5 to about 50, n is from 0 to about 1 and n/m is from about 0.005 to about 0.02 when n is greater than 0, a tertiary amine in an amount of from about 0.1 to about 1.0% of the total weight of the mixture, a solid epoxy resin in which the ratio of epoxy equivalents to mercapto equivalents is from about 0.6:1 to about 0.7:1, or a liquid epoxy resin in which the ratio of epoxy equivalents to mercapto equivalents is from about 0.7:1 to about 0.95:1; and, optionally, adding an amount of a monofunctional epoxy compound sufficient to raise the ratio of total epoxy equivalents to mercapto equivalents from 0.95:1 to a maximum of 1:1 before heating.

9. The elastomer of claim 2 wherein the ratio is from about 0.7:1 to about 0.8:1.

10. The sealant of claim 5 wherein the epoxy resin is a liquid and the ratio is from about 0.7:1 to about 0.85:1.

11. The sealant of claim 10 wherein the ratio is from about 0.7:1 to about 0.8:1.

12. The method of claim 8 wherein the epoxy resin is a liquid and the ratio is from about 0.7:1 to about 0.85:1.

13. The method of claim 12 wherein the ratio is from about 0.7:1 to about 0.8:1.

* * * * *